United States Patent [19]

Jeanneret-Gris

[11] Patent Number: 5,200,473
[45] Date of Patent: Apr. 6, 1993

[54] CHELATING RESINS AND METHOD FOR THEIR USE IN THE EXTRACTION OF METAL IONS

[76] Inventor: Gilbert Jeanneret-Gris, Chemin des Joncheres 4, 2022 Bevaix, Switzerland

[21] Appl. No.: 812,760

[22] Filed: Dec. 23, 1991

Related U.S. Application Data

[63] Continuation of Ser. No. 445,832, Nov. 22, 1989, abandoned.

Foreign Application Priority Data

Mar. 25, 1988 [CH] Switzerland ............... 1135/88

[51] Int. Cl.$^5$ ................................ C08F 8/32
[52] U.S. Cl. ................... 525/381; 521/30; 521/31; 521/32; 525/153; 525/329.4; 525/329.9; 525/330.4; 525/374; 525/379; 525/380; 525/382; 525/383
[58] Field of Search ............ 525/374, 381, 329.4, 525/329.9, 383, 153; 521/32, 31, 30

[56] References Cited

U.S. PATENT DOCUMENTS

| | | | |
|---|---|---|---|
| 4,230,828 | 10/1980 | Gaul, Jr. ............... | 525/153 |
| 4,251,410 | 2/1981 | Danner ............... | 260/29.4 A |
| 4,281,086 | 7/1981 | Gaul, Jr. ............... | 525/330 |
| 4,789,695 | 12/1988 | Farrar ............... | 523/336 |

*Primary Examiner*—Joseph L. Schofer
*Assistant Examiner*—Fred Zitomer
*Attorney, Agent, or Firm*—Zarley, McKee, Thomte, Voorhees & Sease

[57] ABSTRACT

For the preparation of hydrophilic polymer resins with functional groups on ligands, one reacts a resin which consists of units of formula I, in which $R_1$ is hydrogen or an aliphatic residue, with a ligand in the presence of a coupling agent. The reaction is conducted in the presence of a competitive agent which is capable of reacting with the coupling agent at approximately the same rate as the amido group, to achieve a statistical limitation of the reaction of the coupling agent with the polymer. The competitive agent must not react with the resin.

The resin is used for the recovery of metal ions from effluents or natural or industrial residual waters.

8 Claims, No Drawings

CHELATING RESINS AND METHOD FOR THEIR USE IN THE EXTRACTION OF METAL IONS

This is a continuation of copending application Ser. No. 445,832 filed on Nov. 22, 1989 now abandoned.

The present invention relates to the preparation of hydrophilic polymer resins with functional groups on ligands and their use in the selective extraction of dissolved metal ions.

The recovery of metal ions (heavy metals, precious metals, etc.) from the effluents and from natural or industrial residual waters has become increasingly important in recent years, both in industry as well as in the administrations in charge of controlling the quality of waters and their detoxification. The use of chelating resins or ion exchange resins certainly constitutes a simple, effective and economical way to solve this problem. In addition, this method in principle permits an easy recycling of the recovered metal salts.

Numerous resins have been prepared. They can be classified into two groups with sometimes some overlap "resins with a broad spectrum of activity," "nonspecific chelating agents," and resins with restricted action, "specific chelating agents." The most popular of all resins ever prepared is certainly the resin with iminodiacetic acid as ligand, also called IDA ($HN(CH_2COOH)_2$), which is currently produced by no fewer than ten different producers: Diamond Shamrock, Dow Chemicals, Bio Rad Laboratories, Mitsubishi, Reanal, Rohm and Haas, VEB Chemie, Permutit Co., Ltd., Bayer, and Unitaka. Practically all these resins are based on polystyrenedivinylbenzene, a lipophilic polymer which must be made hydrophilic either by a special treatment or by introduction of polar groups. The resin proposed by the Unitaka firm consists of a polymer of the phenolformaldehyde type which has been made hydrophilic by a patented method (Uejima et al., U.S. Pat. No. 4,250,031) and marketed under the trade name Unicellex. The hydrophilic or hydrophobic character of the structure of a resin determines the possibilities of solvation; a hydrophilic resin will react well with a polar solvent, such as water, and not well with apolar solvents, such as organic solvents (benzene, ether, etc.). A metal ion dissolved in a polar solvent will therefore preferably be extracted by a hydrophilic resin. Because nearly the entire chemistry of metal ions occurs in water (hydrometallurgy), ecochemistry, electrochemistry (for example, electroplating), agrochemistry, etc.), the hydrophilic resins are consequently particularly interesting.

Most of the nonspecific chelating resins are used especially in cases where the mixtures of metal ions to be extracted are not too complex and where the properties of the ions are sufficiently different to permit their separation. The IDA-based resins are not effective in the detoxification of natural calcium-containing waters or in the preconcentration of metals present in trace amounts in seawater, because of the concentration of "hindering ions" (for example, the alkaline (sic) metals of the alkaline-earth metals) are too high and prevent an effective extraction of the metal ions. For some applications, specific or semispecific chelating resins are therefore required. In the purification of natural water, it is appropriate to use resins which are capable of distinguishing between the toxic ions (especially heavy metals) and the hindering, but nontoxic, ions (alkaline-sodium, potassium-alkaline-earth-calcium, aluminum, iron, etc.).

In addition, the chelating resin must be capable of forming very stable chelates with metal ions. In fact, the metal ions can already be in a highly complexed form in the solution. Consequently, the resin must form a stronger bond with the metal ion than the ligand. In electroplating, for example, the additives of the polyamine type are currently used to promote electrodeposition of metals on the surfaces. These polyamines, together with the metal ions, from very stable bonds. If one wants to recover the metals by chelation with a resin, it will therefore be appropriate for the latter to have a higher chelation capacity than the additives used.

In general, the larger the number of coordinating atoms of a ligand, the higher the stability of the complexes formed. In the case mentioned above, a good solution would consist in using chelating polyamine resins whose number of nitrogen atoms is higher that of the polyamines used in the electroplating baths. Under these conditions, the metal ion can be extracted quantitatively.

The purpose of the present invention is to provide an improved method for the preparation of hydrophilic chelating resins based on a polyacrylamide which has been modified with a polyamine. It is known how to prepare crosslinked gels of polyacrylamide with an amine, for example by reacting a primary or secondary monoamine with acryl chloride (see for example, Chemische Berichte, Vol. 110, p. 778 (1977)), with acrylamide (German Patent No. A-1,250,491 (1960)), or with formaldehyde as a coupling agent (French Patent No. A-2,354,351). It is also known how to modify of crosslinked gels of polyacrylamide with monoamines or with aminated acids, such as pyroglutamic acid (Kogyo Kagku Zasshi, Vol. 73, p. 1250 (1970)) or, by a coupling agent such as formaldehyde, with aminated acids (French Patent No. A-2,354,351 or Soviet Union Patent No. A-895,980).

A distinction should be made between reactions in which the nitrogen of the amine function is exchanged with the nitrogen of the amide function of the acrylamide or the polyacrylamide, and those in which a coupling agent is used to link the amine and amide functions. In the first case, the chemical properties of the amine function are fundamentally changed, particularly the acidity constant. The amine function loses its alkaline and chelating nature. The amine loses its capacity to chelate metal ions. Such reactions can be obtained both with acrylamide and with polyacrylamide. With the former one can activate, for example, the exchange by introducing successively into an aqueous suspension of the polyacrylamide gel, hydrazine hydrate, followed by sodium nitrite. The amide function ($—CONH_2$ is activated into an azide function ($—CON_3$) which is more reactive. It is then possible to replace the azide group ($—N_3$) with an amine group ($—NH_2$) and to obtain in this manner crosslinked gels of polyacrylamide which have been modified by aminated acid, for example lysine ($H_2N(CH_2)_4CH(NH_2)COOH$). The nitrogen atom used for the bond with the polymer loses its alkaline nature and the grafted lysine must be considered a simple monoaminated acid.

Modifications of polyacrylamide resins crosslinked by a coupling agent have been restricted to molecules containing only one reactive nitrogen atom (monoamines, monoaminated acids). If the molecule to be grafted contains several modifiable nitrogen atoms (for example, polyamines derived from ethyleneimine), the coupling agent can sometimes react several times with the same molecule. As a result, the polyamine can be attached to the polymer by several bonds. It is not certain that these bonds are made on the same fragment of the polymer chain (neighboring bonds). If in fact they are created at different sites on the polymer chain, one in general observes an increase in the crosslinking of the polymer. The resin then becomes hard and brittle and it loses its hydrophilic character. One of the visible consequences is a decrease in the diffusion rate of the metal ions in the resin. The time required to charge the resin increases enormously and one can no longer use it for chromatographic purposes. One also notes that the chelating power decreases significantly. Indeed, because the metal ion must surround itself simultaneously with several nitrogen atoms in order to form a bond with the polyamine, the energy required for this step increases significantly if at the same time several fragments of polymer have to be folded. Thus, a decrease in the mobility of the grafted ligand results often in a very large decrease in the chelating power of a resin.

The object of the present invention is therefore the method for the preparation of a chelating resin according to the definition of claim 1. The method according to the invention uses grafting of polyamine with a coupling agent in order to preserve the entire alkaline nature of the polyamine. However, in order to avoid polyfunctionality, a competitive agent is added to the modification solution. The role of the competitive agent is to limit the possibilities of reaction between the polyamine and the polymer. The coupling agent must be capable of reacting both with the polyamine and with the competitive agent. In contrast, the competitive agent must not be capable of reacting with the resin, either directly or through the intermediary of the coupling agent. It becomes then possible to use concentrations of coupling agent such that the grafting of the polyamine to the polyacrylamide is quantitative without its forming bonds with of several nitrogen atoms. Under these conditions, the polyamine preserves its mobility, because it forms a bond between only one of the nitrogen atoms and the polymer, and its gel properties are unchanged since the crosslinking degree has not increased. After the reaction, the excess coupling agent and excess competitive agent are filtered and thus removed from the solution. The resins obtained according to the method of the present invention permit the quantitative extraction of metals ions (especially heavy and precious metals) from industrial or natural waters. In comparison, the known methods do not permit the preparation of resins capable of extracting metal ions in solutions containing a high concentration of inert ions such as sodium, calcium, etc. In fact, the chelating power of resins based on aminated acid is significantly decreased in the presence of large concentrations of these ions and as a result the capacities are not sufficient to permit indusrial exploitation of this type of resins.

The hydrophilic nature of the resin permits their use under extreme conditions; the term "extreme conditions" is used in the meaning of very short contact times between the solution into which the metal ion are dissolved and the resin itself. It can also be used in dynamic systems (for example, chromatography) and in static systems (for example, resin beds). In addition, the great chemical and mechanical stability of these resins permits their use under a very wide range of conditions. For example, they are resistant to hydrolysis in a wide pH range, to oxidizers or to reductors, to microorganisms, and to high temperatures and/or pressures, etc.

The present invention also describes a method for the regeneration and reuse of these resins, as well as for the recovery and the recycling of the metals.

The resins obtained according to the method of the present invention are characterized by their hydrophilic property. The latter is obtained by means of the presence of hydrophilic units in the structure of the polymer. These hydrophilic units can be of a very wide variety. Hydrophilic units represented by formula I

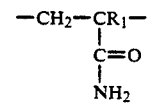

are selected preferentially. The residues $R_1$ are hydrogen or an organic residue and $R_2$ a chelating ligand. The term "hydrophilic polymer" is defined as a polymer which has good wettability properties and, particularly, which can swell in polar solvents such as water. The polymer can consist exclusively of units with formula I, but it can also present between units with formula I, a great variety of molecules or bridges. Typically, one obtains polymers with formula II.

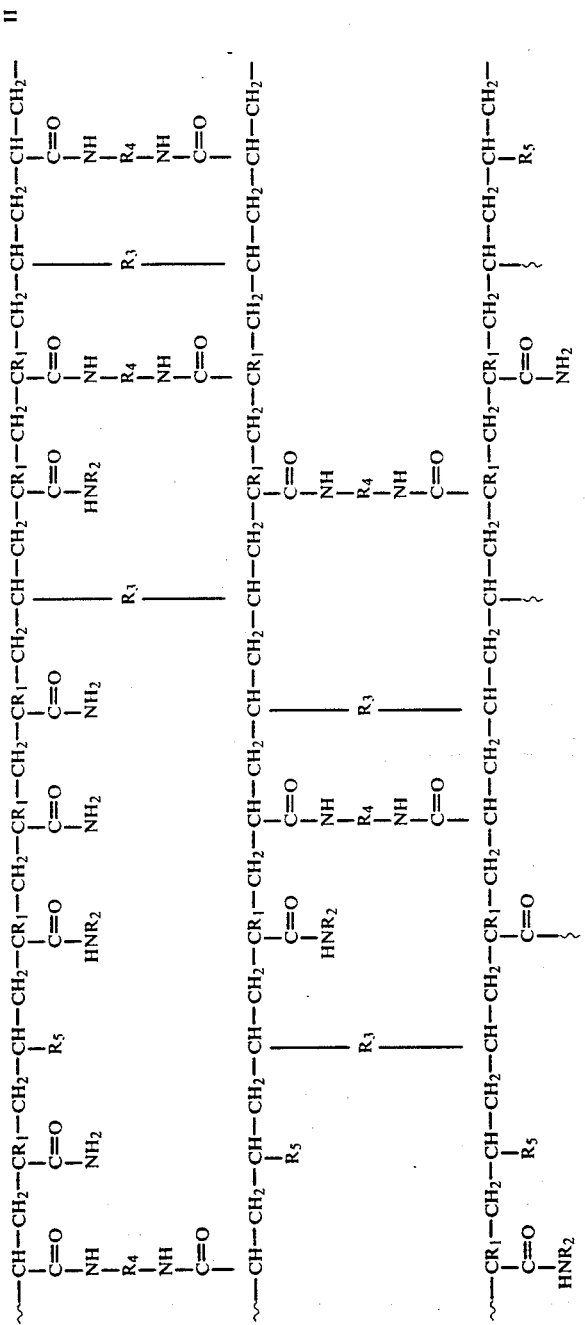

Residues $R_3$, $R_4$, and $R_5$ are in general organic or inorganic groups; they can consist, for example, of alkane units (for example, methylene, ethylene, butylene, etc.), cycloalkanes, aryls (for example, phenyl, etc.), and heterocyclic compounds (for example, pyridyls, etc.). Preferably, the residues $R_3$ and $R_4$ are alkylene units such as methylene or arylene, such as phenylene. $R_5$ is preferably hydrogen, an aryl, such as phenyl, a heterocyclic compound such as pyridyl, pyrrolidinonyl, or imidazolyl. In case where there are no $R_3$ and $R_4$ bridges, the polymer is of the linear polyacrylamide type, and when in formula II, $R_4$ is a methylene bridge, the resin obtained is of the type of a crosslinked polyacrylamide gel.

For a resin to be chelating, a chelating ligand must be connected to the polymer. It is possible to attach several different ligands to the same resin in order to impart to the resin several specific chelating properties at the same time. Chelation is defined as the capacity of a compound to form a stable compound (=chelate) with a metal ion. The nature of this compound (=ligand) is very variable and it depends on the nature of the metal ions to be chelated. Typically, these ligands are molecules which contain carbon chains or rings, branched or linear, and which contain atoms which are capable of forming bonds with the metal ions. These atoms are in general heteroatoms such as nitrogen, oxygen, sulfur, phosphorus, boron, selenium, etc. The carbon chains in general consist of alkyl or aryl chain members and, more particularly, ethylene, propylene, butylene, etc., bridges, phenyl, pyridyl, salicyl, etc. The ethylene, propylene, butylene, salicyl, phenol, methoxyphenol, 2- or 3-pyridyl bridges, etc., are generally preferred to the others. The bridges themselves can be part of aliphatic or aromatic rings. The typical ligands are aminated acids (for example, glycine, iminodiacetic acids, ethylenediaminomono-, di- and triacetic acids, proline, valine, histidine, aspartic acid, and all the other amino acids, etc.), the amines (for example, ammonia, methylamine, dimethylamine, ethylamine, diethylamine, and all the higher molecular weight N-alkyl and N,N-bisalkyl amines, etc., ethylenediamine, propylenediamine, diaminobutane, etc., diethylenetriamine, dipropylenetriamine, triethylenetetramine, tetraethylenepentamine, pentaethylenehexamine, and branched derivatives of these polyamines, etc.), aminoalcohols (for example, 2-aminobutanol, alaninol, valinol, prolinol, etc.), aminothiols, aminophosphonic or sulfonic acids (for example, aminomethanephosphonic acid, aminomethanesulfonic acid, etc.), aminodithiocarbamates (for example, bis(dithiocarbamate)diethylenetriamine, dithiocarbamatediamino-1,2-ethane, etc.), aminoamidoximes, aza-macrocyclic compounds (for example, cyclam, etc.), aza-crown ethers (for example, Kryptofix (registered trademark of Merck Darmstadt (Federal Republic of Germany)), etc.), etc., and combinations of these ligands with each other.

The ligand must be bound to the polymer by an activation molecule (coupling agent). The coupling agent's function is to activate one of the reactants which reacts then with the other molecules. There exists a great variety of coupling agents. However, all coupling agents must meet some conditions: it must be capable of creating at least two bonds (to be shared between the ligand of the active atom of the resin), it must not react several times with the same ligand, it must not undergo degradation during the course of the reaction, etc. However, it can contain two or several activated atoms. In general, the bonds form between two reactive atoms which are typically heteroatoms such as nitrogen, oxygen, sulfur, phosphorus, silicon, etc., and preferably nitrogen, oxygen, and sulfur. Typically, the coupling agent is an aliphatic aldehyde (for example, formaldehyde or derivatives or precursors of which, acetaldehyde, propionaldehyde, glyoxal, etc.), aromatic compounds (for example, benzaldehyde, salicylaldehyde, etc.) or heterocyclic compounds (for example, furfural, derivatives of formaldehyde, such as paraformaldehyde, hexamethylenetetramine, polymers of acetaldehyde, etc.), and others such as mixtures of aldehydes, and precursors of aldehydes, such as the complex precursors of formaldehyde or acetaldehyde. If the aldehyde used is formaldehyde, the bond formed is a methylene bridge ($-CH_2-$). The nature of the coupling agent determines the chelating properties of the grafted ligand. The coupling reaction takes place in a solvent or a mixture of solvents in which the additive and the coupling agent are soluble. In general, it is conducted in water or in a mixture of solvents containing a part of water.

To avoid the multifunctionality of the ligand, a compound is added which is capable of reacting with the coupling agent. This additive can be introduced at any step during the preparation. Its proportion varies depending on the reaction conditions. The amount of additive depends on the excess of coupling agent with respect to the ligand and to the substitution degree required. Typically, it is within a range of ligand-additive-coupling agent ratio of 1:1:2 to 1:10:11, depending on whether the ligand is a polyamine with 3 to approximately 100 units of ethyleneimine.

This additives must be capable of reacting with the coupling agent, possibly with the ligand, but not with the polymer. Good additives are those which consist of the same units as the polymer because, on the one hand, they cannot react directly with the ligand and, on the other hand, the rate of their reaction with the coupling agent is on the same order of magnitude as that of the ligand. Thus, good additives are amides which are soluble in aqueous solutions, such as urea, formamide, acetamide, acrylamide, methacrylamide, etc. However, one can find additives in other groups of compounds, particularly organic compounds with an active hydrogen associated with a metal ion (for example, cupric salts in the presence of nitromethane, nitroethane, etc., malonic acid, etc.), and the compounds permitting the reduction of the formaldehyde when the latter is the coupling agent, such as formic acid, etc., or others such as phenol or the other phenol compounds, etc., malonic acid, etc.), and the compounds permitting the reduction of the formaldehyde when the latter is the coupling agent, such as formic acid, etc., or others such as phenol or the other phenol compounds, etc.

The reaction time is generally between 0.2 hour and 48 hours, more frequently between 2 hours (time required for the dissolution of the paraformaldehyde at pH 10, for example) and 24 hours. The temperature of the solution is kept between room temperature and the boiling temperature of the most volatile solvent; in general, the coupling reactions are conducted in pure water (in this case the temperature of the solution is at most 100° C.). The coupling reactions are conducted preferably between 15° C. and 80° C. When operating at high temperatures, care is taken to keep the volume of the solution constant. The capacity of the polymers or resins depends on the crosslinking degree, the proportion of modifiable units (of the type with formula I, for example), etc. . . . For polyacrylamide gels, the typical capacity is between 0.01 and 4.5 moles of grafted ligand per kg dry resin. However, usually it is between 0.1 and 2 moles of ligand per kg dry resin.

The hydrophilic chelating resins prepared according to the present invention are capable, when brought in contact with aqueous solutions or mixtures of solvents containing one or more metal ions, of forming metal complexes. The temperature of the solutions can vary from 5° C. to 100° C.; it is preferably between 15° C. and 85° C. The procedures consist either of introduction of the resin into a column and allowing the solution which contains the metal ions to flow through the column, or it consists in placing the resin first into a container, then pouring the solution of metal ions on top of it, followed by filtration and rinsing of the resin with water, for example. In general, the dynamic methods (columns) yield better results than the static methods (beds), and they are therefore used when possible. The time during which the resin and the solution must be in contact varies and depends on factors as diverse as the quantity of the resin and metal ions, and the rate at which the solution flows through the column (in the dynamic system), etc. Contact times from 1 minute to 50 hours are therefore typical, although most of the time it suffices to leave the resin and the solution in contact for 0.1 hour to 5 hours.

The selectivity of the resins prepared according to the present invention depends on the nature of the metal ions and the ligand grafted onto the resin. When two metal ions are capable of forming a chelate with the ligand, various factors must be considered to determine the selectivity of the resin: the pH of the solution, the concentration of the metal ions, the formation constants of the complexes for each one of the metal ions, the exchange kinetics of the complexes, etc. The last effect mentioned means that if a metal ion forms an inert chelate with the ligand, the chelate will be formed preferentially over other complexes, because an inert complex cannot be destroyed by a unstable complex. For example, a polyamine forms with nickel an unstable complex and with chrome an inert complex. Consequently, chrome will be preferred over nickel in chelation reaction. The formation of metal chelates in general depends on pH; the most stable complexes are those which are formed preferably in the pH range considered, even if, in absolute value, other metal ions can form more stable complexes. Copper(II) and iron(III) both form extremely stable complexes with the phenol compounds; iron(III), however, already forms a chelate with ligands in an acidic medium, while the chelation of copper(II) starts only in a neutral medium. The selectivity of the resin is therefore modified when the pH varies. Finally, the selectivity can be changed by changing the concentrations of the metal ions. For example, copper(II) forms aminated complexes which are much more stable compared to those formed with nickel(II). However, if the concentration of the nickel is much higher than that of the copper, nickel(II) will be capable of destroying the copper complexes. Other examples are mentioned in the introduction and in the examples.

When the resin is saturated, that is all the ligands are chelated by metal ions or the concentrations of metal ions in the eluate becomes too high, the resin must be regenerated. There are several methods for this purpose.

The first method consists in modifying the pH of the resin, by bringing it back into a range where the coordination of metal ions is not possible. Below pH 5-6, metal ions can no longer chelate polyamines, for example. In fact, the former are in the form of ammonium ions which are incapable of chelating. A resin which is saturated with metal ions (for example, nickel(II), copper(II), cobalt(II), etc.) can therefore be regenerated by bringing the pH of the resin into the acid range. The metal ions are again dissolved and the resin, after neutralization with a base, is again ready for use.

A second method of proceeding consists in bringing the resin in contact with a more powerful chelating ligand than the one which is bound to the resin. For example, the cyanide ion forms extremely stable complexes with most metal ions. In fact, they are so stable that practically no other ligand can destroy a cyanide metal complex. Thus, a resin of the polyamine type, which is saturated with metal ions, can be regenerated simply by washing with a solution (with a basic pH) which contains the cyanide ion. After simple washing with water, the resin is then again ready for use.

A third method of proceeding consists in changing the degree of oxidation of the metal ion to make it incapable of chelation.

The following examples serve as illustrations of some of the possible resins prepared according to the present invention. They are in no case limiting, since the material presented here is only an illustration of a generally applicable method.

EXAMPLE 1

10 g of gel are prepared according to French Patent No. A-2,354,351. in accordance with French patent, the resin was prepared in the following manner. 7.5 g of methyloloacrylamide, 3.5 g of methylene-bis-acrylamide, 0.1 g of potassium persulfate and 4 g of a surfactant agent "BP.NET" are put in suspension into 2 ml of water. The whole is put in suspension in 1:1 of cyclohexane, agitating under reflux of 30 minutes. The polymerized resin is obtained in the form of beads which are filtered and washed. Commercial polyacrylamide can however be used as well, e.g. "BioGel P6" from Bio-Rad Laboratories, Richmond, CA 94804.

They are suspended in 50 mL of water, mixed with 5.3 g iminodiacetic acid and with 3.2 g sodium hydroxide dissolved in 150 mL water. The suspension is stirred and 12 g of paraformaldehyde are added. After 4 hours of stirring at room temperature, the resin is filtered, washed successively with water, alcohol, and acetone. The resin obtained has a copper content of 0.6 mEq/g dry resin.

EXAMPLE 2

30 g of polyacrylamide prepared as in Example 1 are suspended in 300 mL of water. 8 g ethylenediamine hydrochloride dissolved in 50 mL of water, 5 mL 37% formalin, and 1.2 g urea are added to the suspension and the entire mixture is stirred for 20 hours at room temperature. The pellets of resin are treated as in Example 1. The capacity of the resin obtained is 0.5 mmole per g of dry resin (based on the [amount of] copper).

EXAMPLE 3

30 g of resin are prepared with 21 g cyclam hydrochloride, 20 mL 37% formalin, and 8.4 g urea as in Example 1. The capacity of the resin obtained is 0.5 mmole per g dry resin (based on the [amount of] copper).

EXAMPLE 4

The procedure is identical to the one of Example 1, except that 30 g of resin, 22 g tetraethylenepentamine hydrochloride, 25 mL 37% formalin, and 18 g acrylamide are used. The resin obtained has a capacity of 0.5 mmole per g dry resin (based on the [amount of] copper).

EXAMPLE 5

20 L of solution containing 100 mg/L rhodium, 40 mg/L nickel, 33 mg/L copper, 5 g/L sodium, and 300 mg/L calcium are eluted through a column prepared with 100 g of resin, like the column prepared in Example 4. The column is first rinsed with water, then with diluted hydrochloric acid. Two washings eliminate the sodium and the calcium, then the nickel and the copper, respectively. The resin is removed from the column, then it is incinerated. The recovery consists of 1.9 g of rhodium in the form of contamination-free gray ashes.

EXAMPLE 6

10 ml of solution containing 5.4 mg/L cadmium, 2 mg/L chromium (III), 4.04 mg/L copper, 8 mg/L mercury (II), 2.9 mg/L nickel, 7.2 mg/L lead, and 4.2 mg/L zinc are eluted through a column filled with 100 g of resin prepared according to Example 4. After elution of the solution, the resin is rinsed with 10 mL of water and the eluate is analyzed. At this time, the detection still showed 0.01 mg/L cadmium, 0.07 mg/L chrome (III), 0.02 mg/L copper, 0.0018 mg/L mercury (II), 0.03 mg/L nickel, 0.03 mg/L lead, and 0.02 mg/L zinc. The resin is regenerated by means of one washing with $HNO_3$, one rinsing with water, one neutralization with 2M NaOH, and one rinsing with water until neutrality is reached. The resin is then readied for reuse.

EXAMPLE 7

A decimolar hydrochloric acid which contains, respectively, 10 mg/L platinum, palladium, and rhodium, as well as 10 g/L copper, is eluted through a column which contains 20 g of resin prepared in Example 4. When the resin is saturated, one observes that all the rhodium and copper are eluted. Part of the platinum is retained. The composition on the resin is approximately 75% palladium and 25% platinum. The elution with 6M hydrochloric acid (3 volumes of resin) permits selection for palladium (the platinum remains attached to the resin) with an elution rate of approximately 95%.

The rhodium can be separated form the copper as described above in Example 5.

I claim:

1. A method for the preparation of hydrophilic polymer resin, beads, having functional groups forming chelating ligands for metal ions, which comprises: reacting a cross-linked resin comprising units of the formula (I)

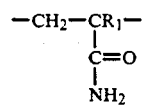

Formula (I)

in which $R_1$ is hydrogen or an aliphatic or aryl moiety, in an aqueous suspension with chelating ligands selected from the group consisting of amino acids, polyamines aminoalcohols, aminothiols, aminoaldoximes, azamacrocyclic compounds, aza-crown-ethers, amino phosphonic and sulfonic acids in an aqueous solution;

said reaction occurring in the presence of a coupling agent selected from the group aliphatic, aromatic, and heterocyclic aldehydes, and in the presence of a competitive agent selected from the group of soluble amides and organic compounds having active hydrogen atoms for association with metal ions, in an aqueous acidic medium;

whereby said competitive agent reacts with the coupling agent at approximately the same rate as the amido groups of the formula (I) resin.

2. A method according to claim 1, wherein $R_1$ is selected from the group consisting of hydrogen, and alkyl.

3. A method according to claim 1, wherein the time of reaction is in the range from 12 minutes to 48 hours and the temperature is not exceeding 100° C.

4. A method according to claim 1 wherein the ligand-/competitive agent weight ratio is from 1:1 to 1:10.

5. A method according to claim 1 wherein the competitive agent is urea, formamide, acetamide, acrylamide, or a copper salt in the presence of nitromethane or nitroethane, or malonic acid.

6. A method according to claim 1 wherein the coupling agent is formaldehyde.

7. A method according to claim 1 wherein the cross-linked resin comprising units of formula 1 are beads from cross-linked polyacrylamide.

8. A method according to claim 1, wherein for 10 g of polyacrylamide one uses between 10 and 50 ml of 3.7% aqueous solution of tetraethylenepentamine hydrochloride, 7.5 to 15 ml of 36% formalin in water as a coupling agent, and up to 18 g of acrylamide as a competitive agent are used.

* * * * *